United States Patent
Park et al.

(10) Patent No.: US 8,963,495 B2
(45) Date of Patent: Feb. 24, 2015

(54) BATTERY EXCHANGING METHOD FOR ELECTRIC VEHICLE

(75) Inventors: Jun Seok Park, Seoul (KR); Won-Kyu Kim, Seoul (KR); Hee-Jeing Park, Gunpo-si (KR); Hee Seok Moon, Asan-si (KR); Woongchul Choi, Seoul (KR); Jayil Jeong, Seoul (KR); Chi Man Yu, Bucheon-si (KR); Do Yang Jung, Anyang-si (KR); Yong-hark Shin, Seoul (KR); Jae-Hong Park, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 379 days.

(21) Appl. No.: 13/485,769

(22) Filed: May 31, 2012

(65) Prior Publication Data
US 2012/0306445 A1 Dec. 6, 2012

(30) Foreign Application Priority Data
Jun. 1, 2011 (KR) .................. 10-2011-0052913

(51) Int. Cl.
*H02J 7/00* (2006.01)
*H01M 8/00* (2006.01)
*B60S 5/06* (2006.01)

(52) U.S. Cl.
CPC . *B60S 5/06* (2013.01); *Y02T 90/124* (2013.01)
USPC .............................. 320/109; 29/730; 29/763

(58) Field of Classification Search
USPC ........................................................ 320/109
See application file for complete search history.

(56) References Cited

FOREIGN PATENT DOCUMENTS

CN 102039876 5/2011

*Primary Examiner* — Sun Lin
(74) *Attorney, Agent, or Firm* — Kile Park Reed & Houtteman PLLC (57) ABSTRACT

Provided is a battery exchange method for an electric vehicle. The battery exchange method includes (a) opening a protection cover of a battery mounting module installed at an upper portion of the electric vehicle, and transmitting an open signal to a battery charge station; (b) releasing a locking unit of a pre-mounted battery, and transmitting an unlocking signal to the battery charge station; (c) determining and storing a mounting location of the battery using an image sensor; (d) controlling movements and operations of a battery replacing robot when the unlocking signal is confirmed, and ejecting the pre-mounted battery from a battery seating base of the battery mounting module; (e) controlling movements and operations of the battery replacing robot to move a prepared fully charged battery into the battery mounting module, and mounting the fully charged battery on the battery seating base in the battery charge station.

16 Claims, 8 Drawing Sheets

BATTERY EXCHANGING METHOD FOR ELECTRIC VEHICLE

CROSS-REFERENCE TO RELATED APPLICATION

This application claims priority under 35 U.S.C. §119 to Korean Patent Application No. 10-2011-0052913 filed on Jun. 1, 2011, the disclosure of which is hereby incorporated by reference in its entirety.

BACKGROUND

1. Field of the Invention

Embodiments of the inventive concept relate to battery exchange for an electric vehicle and in particular, to technology by which a battery of an electric vehicle can be exchanged easily, conveniently and quickly.

2. Description of Related Art

A vehicle, which is essential to human life and socioeconomic activities, is a moving means that moves using fossil energy such as oil. However, fossil energy is a finite resource and is thus becoming depleted over time and the price is constantly rising.

In particular, fossil energy emits various exhaust gases that pollute the environment in the process of use and a large quantity of carbon dioxide that is a main contributing factor to global warming. Thus, in order to reduce carbon dioxide emissions, a variety of research and development activities are being performed throughout all industries in various countries of the world. As an alternative, electric vehicles which move using electricity as an energy source have been developed.

Electric vehicles that have been developed include a pure electric vehicle (battery powered electric vehicle), a hybrid electric vehicle with an electric motor and an engine, a fuel cell electric vehicle, etc. In addition, in order to expand the vitalization and dissemination of electric vehicles, a charge infrastructure by which charging can be easily performed at any time and any place is essential, and thus a variety of research thereon is underway.

However, since electric vehicles use batteries charged in a plug-in manner, unlike a vehicle that uses oil (gasoline, diesel, etc.) or natural gas, the long charging time is inconvenient for drivers and removes any economic efficiency for companies operating charging facilities.

In order to solve the above problems, in recent years, charging technology including a method of precharging a battery and exchanging the fully charged battery instead of charging of a battery in an electric vehicle directly (hereinafter referred to as a "battery replacing method") has been proposed.

Such a battery replacement method has an advantage in that when a driver in need of charging visits a battery charge station, the driver can conveniently replace his or her pre-used with a precharged battery and mount the precharged battery.

However, in the conventional battery replacing method, since the battery replacement is performed on the floor of the electric vehicle, the replacing system should be installed underground, and thus there are drawbacks in that it becomes very expensive to install and operate the replacing system.

In addition, in the case of an electric vehicle driving along a regular route, a method by which a battery can be easily and rapidly exchanged without leaving a driving path is needed.

SUMMARY

Embodiments of the inventive concept provide a battery exchange method by which a battery can be exchanged from an upper portion of an electric vehicle without inconvenience in the operation of the vehicle.

Another embodiment of the inventive concept provides the battery exchange method by which the battery can be exchanged efficiently and conveniently, by automatically performing a battery replacing task through communication between an electric vehicle and a battery charge station.

In accordance with one aspect of the invention, there is a method of exchanging a battery for an electric vehicle, comprising: (a) transmitting, to the electric vehicle, a confirmation signal that confirms an entry location of the electric vehicle when the electric vehicle enters a battery charge station; (b) lowering a protection guide installed in the battery charge station to seal a battery mounting module mounted on an upper portion of the electric vehicle, and transmitting a seal confirmation signal to the electric vehicle; (c) determining and storing a location of the battery mounted in the battery mounting module using an image sensor in the battery charge station; (d) ejecting a pre-mounted battery from a battery seating base of the battery mounting module by controlling movements and operations of a battery replacing robot in the battery charge station when unlocking information of the battery is transmitted from the electric vehicle; (e) controlling the battery replacing robot to move a prepared fully charged battery into a location of the battery mounting module and mounting the fully charged battery on the battery seating base in the battery charge station; and (f) transmitting mounting completion information from the battery charging station to the electric vehicle.

In accordance with another aspect of the invention, there is a battery exchange method for an electric vehicle, comprising: (a) opening a protection cover of a battery mounting module installed at an upper portion of the electric vehicle, and transmitting an open signal to a battery charge station, in the electric vehicle; (b) releasing a locking unit of a pre-mounted battery, and transmitting an unlocking signal to the battery charge station, in the electric vehicle; (c) determining and storing a mounting location of the battery using an image sensor in the battery charge station; (d) controlling movements and operations of a battery replacing robot when the unlocking signal is confirmed, and ejecting the pre-mounted battery from a battery seating base of the battery mounting module, in the battery charge station; (e) controlling movements and operations of the battery replacing robot to move a prepared fully charged battery into the battery mounting module, and mounting the fully charged battery on the battery seating base in the battery charge station; (f) transmitting a battery mounting completion signal from the battery charge station to the electric vehicle; and (g) locking the fully charged battery after confirming a connection of the battery in the electric vehicle.

Further the method comprising, prior to step (a), (h) confirming whether the electric vehicle is a reserved vehicle when the electric vehicle enters a body of the battery charge station, in the battery charge station; and (i) transmitting an entry grant signal to the electric vehicle when the electric vehicle is reserved to confirm a type of the battery of the electric vehicle, and preparing the fully charged battery to be replaced in the electric vehicle.

Further, The method comprising, prior to step (a): (j) confirming an entry location when the electric vehicle enters the battery charge station; and (k) lowering a protection guide installed in the battery charge station to seal the battery mounting module.

In accordance with another aspect of the invention, a battery exchange method for an electric vehicle is provided comprising: (a) opening a protection cover of a battery mounting module installed at an upper portion of the electric vehicle, and transmitting an open signal to a battery charge station, in the electric vehicle; (b) releasing a locking unit of a pre-mounted battery, and transmitting an unlocking signal to the battery charge station; (c) removing the pre-mounted battery from the electric vehicle and mounting a fully charged battery on the battery mounting module; (d) receiving mounting completion information from the battery charge station, in the electric vehicle; (e) locking the mounted fully charged battery and transmitting a locking signal to the battery charge station, in the electric vehicle; and (f) storing, by the electric vehicle, battery exchange information and exiting from the battery charge station when an elevating confirmation signal of a battery protection guide and an exit grant signal are received from the battery charge station.

In accordance with another aspect of the invention, a battery charge station system for an electric vehicle employing a battery exchange method is provided comprising: a rechargeable battery mounted on a battery mounting module of the electric vehicle; a battery charge station body which is formed so as to allow the electric vehicle to freely access the battery charge station and which has a battery loading unit for loading the battery; a battery replacing robot provided in the battery charge station body to actually perform the replacement operation of the battery; and a battery charge station control unit for allowing a battery replacing operation to be performed by controlling the battery replacing robot.

The battery charge station system further comprising: a communication module for receiving reservation information on battery replacement from the electric vehicle and providing confirmation information on whether it is possible to replace the battery.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF THE EMBODIMENTS

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

Hereinafter, specific embodiments of the inventive concept will be described with reference to the drawings.

Figure 1:
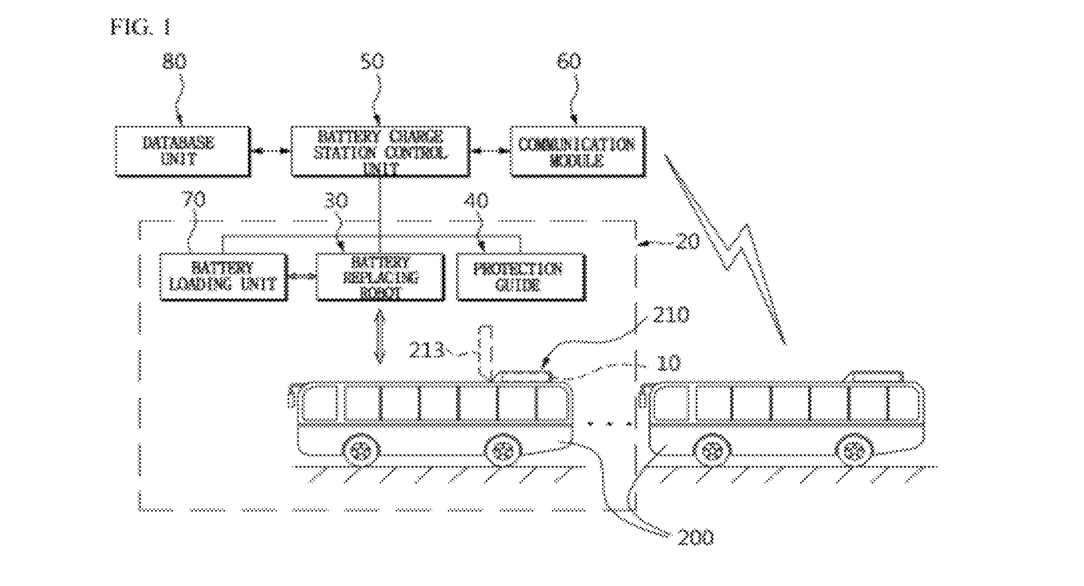
FIG. 1 is a block diagram for explaining a battery exchanging system for an electric vehicle in accordance with an embodiment of the inventive concept.
Figure 2:
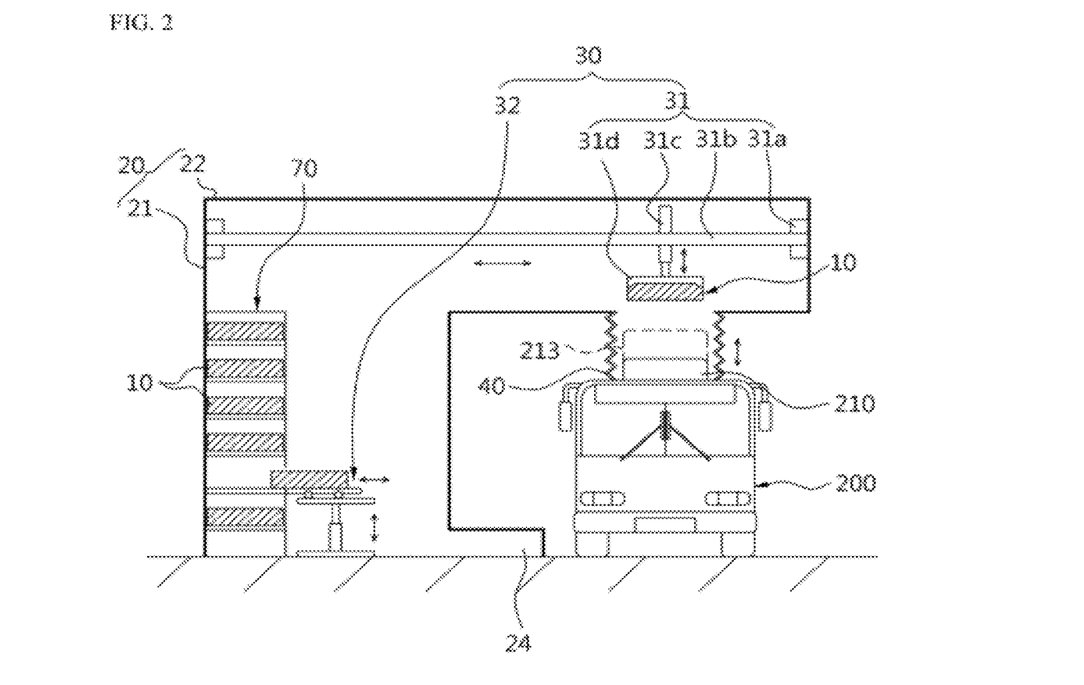
FIG. 2 is a schematic configuration view for explaining a battery exchanging system for an electric vehicle in accordance with an embodiment of the inventive concept.
Figure 3:
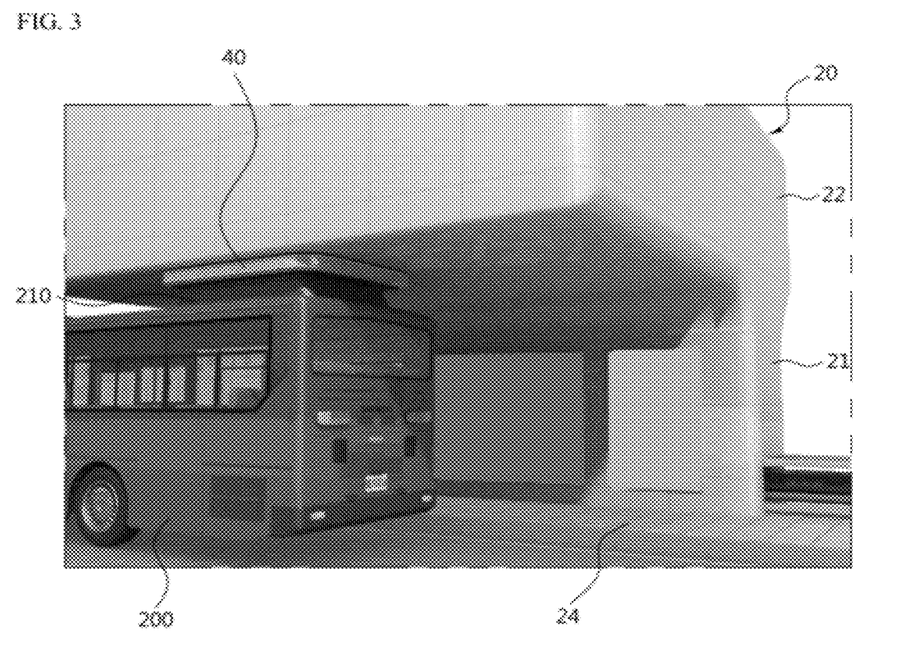
FIG. 3 is a perspective view representing an exterior structure of a battery exchanging system for an electric vehicle in accordance with an embodiment of the inventive concept.

FIG. 1 is a block diagram for explaining a battery exchanging system for an electric vehicle in accordance with an embodiment of the inventive concept, FIG. 2 is a schematic configuration view for explaining a battery exchanging system for an electric vehicle in accordance with an embodiment of the inventive concept, and FIG. 3 is a perspective view representing an exterior structure of a battery exchanging system for an electric vehicle in accordance with an embodiment of the inventive concept.

Referring to FIGS. 1 to 3, the battery exchanging system for an electric vehicle 200 in accordance with an embodiment of the inventive concept may include a rechargeable battery 10 mounted on a battery mounting module 210 of the electric vehicle 200, a battery charge station body 20 in which a fully charged battery is stored and a battery replacing operation is performed, a battery replacing robot 30, a protection guide 40, a battery charge station control unit 50 that allows a battery replacing operation to be performed by controlling the battery replacing robot 30, a communication module 60 and battery loading unit 70. The battery exchanging system is implemented in a battery exchanging method by which the entire battery can be exchanged so as to replace a battery applied as an energy source of the electric vehicle 200 quickly and accurately based on robotic technology.

Figure 4:
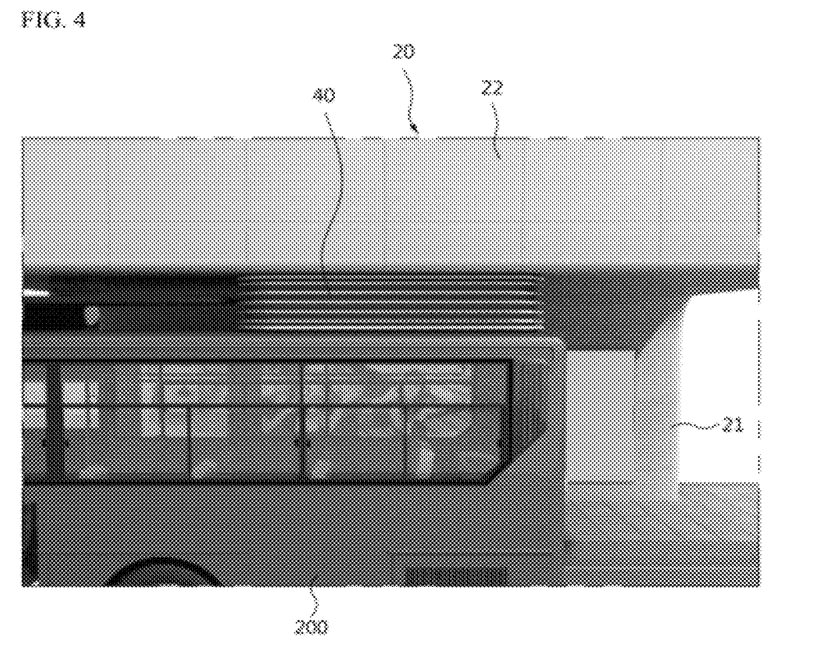
FIG. 4 is an expanded perspective view representing a main portion of an exterior structure when exchanging a battery in a battery exchanging system for an electric vehicle according to a battery exchanging method in accordance with an embodiment of the inventive concept.
Figure 5:
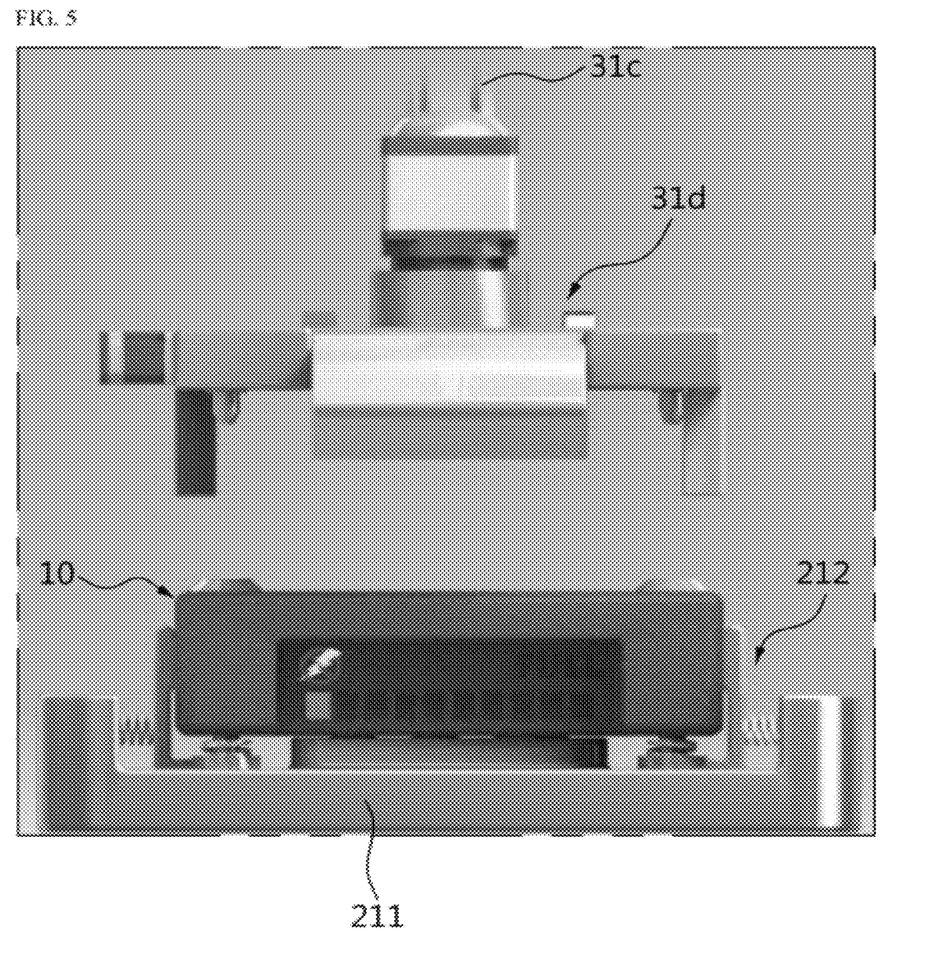
FIG. 5 is a view for explaining structures and operations of a battery replacing robot and a battery mounting module in a battery exchanging system in accordance with an embodiment of the inventive concept.

FIG. 4 is an expanded perspective view representing a main portion of an exterior structure when exchanging a battery in the battery exchanging system for the electric vehicle 200 according to a battery exchanging method in accordance with an embodiment of the inventive concept; and FIG. 5 is a view for explaining structures and operations of the battery replacing robot 30 and a battery mounting module 210 in the battery exchanging system of the electric vehicle 200 in accordance with an embodiment of the inventive concept.

The battery charge station body 20 is a structure that actually performs an operation of replacing the battery 10 after the electric vehicle 200 enters the battery charge station, and is formed so as to allow the electric vehicle 200 to freely access the battery charge station. The battery charge station body 20 includes the battery loading unit 70 for loading the battery 10.

In addition, the battery charge station body 20 according to the embodiment is configured to include a vertical body 21 extending in a vertical direction and coming in contact with a road, and a horizontal body 22 extending in a horizontal direction from a top portion of the vertical body 21 toward the road, as shown in FIG. 2. Thus, the battery replacement operation can be performed easily under bad weather conditions such as rain, snow and the like. However, as long as the electric vehicle 200 can enter and exit the battery charge station and the replacement operation can be easily performed, the structure or type of the battery charge station body 20 is not limited.

In addition, a platform 24 for passengers to use is provided between the vertical body 21 and the road, and a bottom of the horizontal body 21 is provided with at least one outlet for taking the battery 10 out.

In particular, the battery charge station body 20 includes the protection guide 40 for sealing the battery mounting module 210 which mounts the battery 10 when the electric vehicle 200 enters the battery charge station, in order to avoid ill effects according to changes in the external environment when replacing the battery 10. The protection guide 40 according to the embodiment is configured of a corrugate tube that is folded toward the battery mounting module 210 in a state in which the battery 10 is mounted inside the battery charge station body 20 when the battery 10 is being replaced and is unfolded to an original position after the battery 10 is replaced. However, as long as the battery mounting module 210 including the battery 10 can be effectively sealed and protected during the process of replacing the battery 10, the protection guide 40 may be configured to have various structures without limitation.

In addition, as shown in FIGS. 3 and 4, the protection guide 40 is configured to include a sealed membrane such as a flexible hose which is installed in the outlet disposed at the bottom of the horizontal body 22, and a door driving unit (not shown) which can operate the sealed membrane in the vertical direction under the control of the battery charge station control unit 50.

The battery replacing robot 30 is provided in the battery charge station body 20 to actually perform the replacement operation of the battery 10. Any transport robot that can be applied in various industrial fields may be adopted as the battery replacing robot 30 without limitation, as long as the replacement operation can be performed effectively.

For example, in the embodiment, the battery charge station body 20 may be have an approximate " " shape. Thus, the battery replacing robot 30 may be configured to include a battery transporting and mounting robot 31 and a battery ejecting and loading robot 32 so as to be suitable for the structure of the battery charge station body 20.

The battery transporting and mounting robot 31 may be a robot that removes a discharged battery previously mounted in the battery mounting module 210 of the electric vehicle 200, and then transports and mounts a charged battery, which is ejected from the battery loading unit 70, to the battery mounting module 210. In addition, the battery ejecting and loading robot 32 may be a robot that ejects a charged battery 10 stored in the battery loading unit 70 and then provides the charged battery to the battery transporting and mounting robot 31, or receives a discharged battery from the battery transporting and mounting robot 31, and then loads into the battery loading unit 70.

The battery transporting and mounting robot 31 and the battery ejecting and loading robot 32 may be configured by properly disposing at least a pair of robots, depending on the size of the battery charge station body 20, a processing scale of the battery 10 and the like.

The battery transporting and mounting robot 31 may be configured to include a fixed rail 31a installed at the upper portion of the battery charge station body 20, a transporting rail 31b installed to be moved in the direction orthogonal to the fixed rail 31a, an elevating rail 31c installed to be moved along the longitudinal direction of the transporting rail 31b, or in the direction orthogonal to the transporting rail 31b and a clamping unit 31d installed at the bottom of the elevating rail 31c to perform locking and unlocking operations in the process of replacing the battery 10. In addition, although the fixed rail 31a, the transporting rail 31b and the elevating rail 31c are not shown in detail in the drawings, it is obvious that driving units which generate power for the rails or apply the power to the rails may be included therein.

Although one battery transporting and mounting robot 31 is shown in FIG. 2, a plurality of battery transporting and mounting robots may be provided. For example, the battery replacement operation can be rapidly achieved by two transporting and mounting robots performing detaching and mounting of the battery for one electric vehicle 200 at the same time.

The battery charge station control unit 50 controls the battery replacing robot 30 and the protection guide 40 to ensure the battery replacement, and may be implemented by a processor, a controller and a control code.

The communication module 60 is for communicating with the electric vehicle 200, and various communication methods such as code division multiple access (CDMA), near field communication (NFC), radio-frequency identification (RFID) or the like can be applied.

The database unit 80 may store the number, charging status, reservation information, etc., of batteries stored in the battery loading unit 70 and may be updated according to the operation and reservation of the battery replacement.

In addition, a battery charge station 100 includes an imaging sensor (not shown) and an algorithm for performing processing of recognizing the location of the battery 100 mounted in the electric vehicle 200 by processing a photographed image. The image sensor may be preferably installed around the protection guide 40, for example, on a good location for photographing the battery mounting module 210.

Referring to FIGS. 1 and 5, the electric vehicle 200 includes the battery mounting module 210 on which the battery 10 is mounted. The battery mounting module 210 is installed on a frame (not shown) of the electric vehicle 200, and includes a battery seating base 211 on which the battery 10 is seated, and having a terminal unit which electrically connects the battery 10, a plurality of fixing units 212 which fix the battery 10 to the battery seating base 211, and a protection cover 213 (see FIG. 2) installed to seal a portion of the battery seating base 211 and to be opened when the battery 10 is being replaced.

The protection cover 213 may be configured to have various types in which the battery seating base 211 on which the battery 10 is seated can be effectively sealed and is opened when the battery 10 is being replaced to rapidly perform the replacement operation of the battery 10 by the clamping unit 31d. For example, the protection cover 213 may be configured as a structure in which the protection cover 213 may be closed and opened in front and rear directions of the battery seating base 211 as shown in FIG. 4. In addition, the protection cover 213 may be preferably configured as a structure in which the protection cover 213 may be closed and opened at the inner space surrounded by the protection guide 40 as briefly shown in FIG. 2, such that the battery 10 is exposed to the external environment as little as possible.

The battery fixing unit 212 may be installed at the edge of the battery seating base 211 to perform locking and unlocking operations in order to fix or release the battery 10.

Hereinafter, the battery exchanging method in the battery exchanging system of the electric vehicle 200 according to FIGS. 1 to 5 will described in detail.

FIGS. 6 to 10 are flowcharts illustrating a battery exchanging method for an electric vehicle 200 in accordance with an embodiment of the inventive concept.

Figure 6:
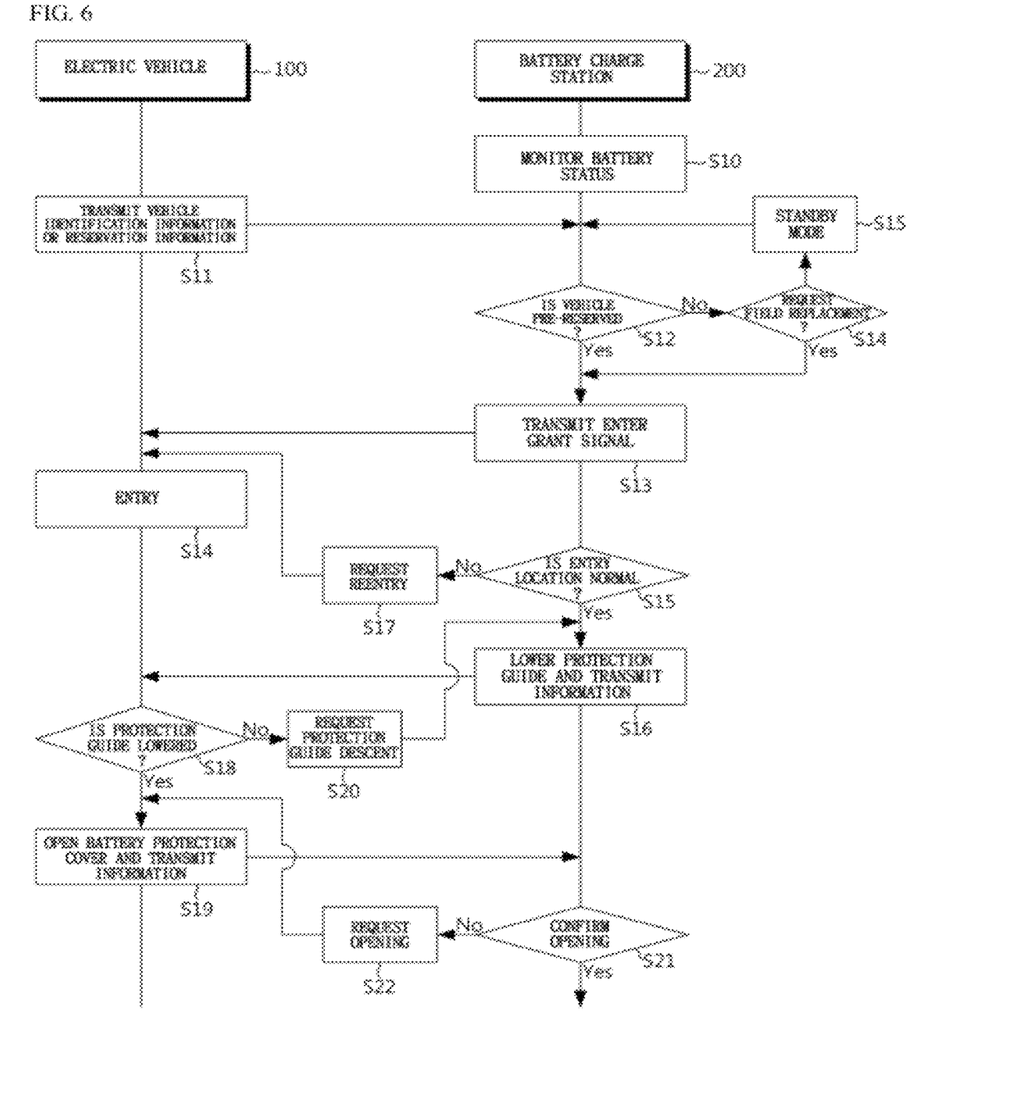
FIGS. 6 to 10 are flowcharts illustrating a battery exchanging method for an electric vehicle in accordance with an embodiment of the inventive concept.

Referring to FIG. 6, the battery charge station 100 monitors a status, reservation information, etc., of the battery 10 stored in the battery loading unit 70 in step S10. When the electric vehicle 200 enters the battery charge station 100, identification information on the battery or reservation information is transmitted to the battery charge station 100 in step S11. The transmitting of identification information and/or reservation information on the battery from the electric vehicle 200 to the battery charge station 100 may be achieved by the request of the battery charge station when the electric vehicle 200 enters the battery charge station 100, by instructions of the user of the electric vehicle 200, or by setting the corresponding information to be transmittable from the electric vehicle 200.

The battery charge station control unit 50 may confirm whether the vehicle has been reserved by checking the identification information or reservation information of the electric vehicle 200 in step S12. In this case, the battery charge station control unit 50 may confirm the vehicle using only the transmitted information, or by comparing the transmitted information with information already stored in the database unit 80.

When it is confirmed that the vehicle has been reserved, the battery charge station control unit 50 transmits a grant signal to the electric vehicle 200 in step S13, and allows the electric vehicle 200 to enter the replacement position in step S14. When the reservation information cannot be confirmed, the battery charge station control unit 50 may transmit the grant signal to allow entry or enter a standby mode, depending on a judgment as to whether or not the battery will be replaced in the field without the reservation in steps S13, S14 and S15.

When it is determined that an entry position of the electric vehicle 200 is on a normal position in the battery charge station 100, the protection guide 40 may descend such that the replacement operation of the battery can be stably performed, without being exposed to the outside of the protection guide, and the information on this may be sent to the electric vehicle 200 in step S16. Meanwhile, when an entry position of the electric vehicle 200 is not the normal position, reentry of the electric vehicle 200 may be requested to the electric vehicle 200 in step S17.

When the protection guide 40 descends in step S18, the battery protection cover 213 is opened by the electric vehicle 200 and information on this is sent to the battery charge station 100 in step S19. When the protection guide 40 does not receive the information about the descent of the protection guide 40, or it is determined that the protection guide 40 has not descended, the battery charge station control unit 50 requests the descent of the protection guide 40 to the battery charge station 100 in step S20.

Figure 7:
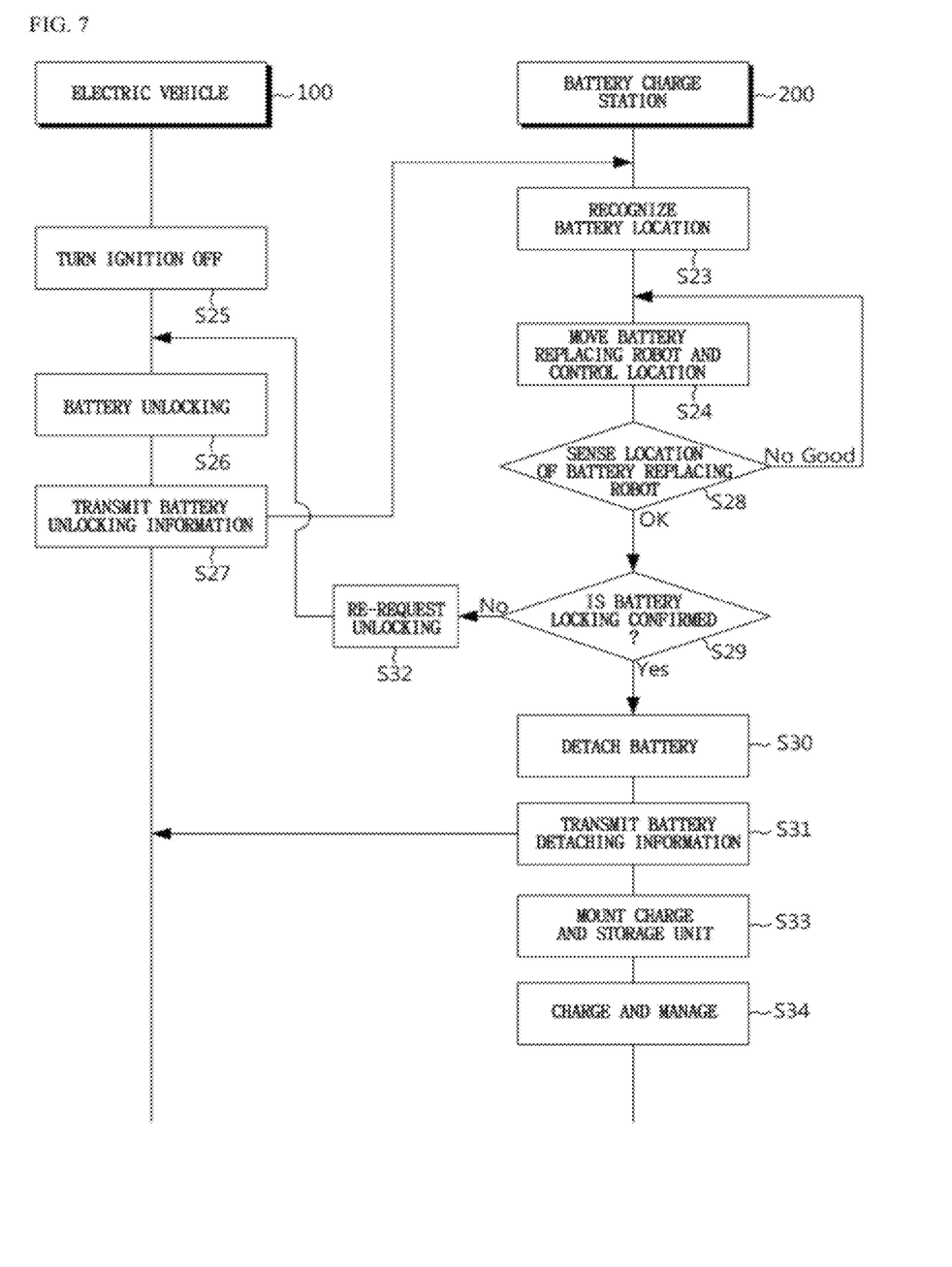

The battery charge station 100 performs the genuine battery replacement operation as in FIG. 7 when it is confirmed that the protection cover 213 is opened in step S21. If the information about the opened protection cover 213 is not received, or it is determined that the protection cover 213 is not opened, the battery charge station control unit 50 requests the opening of the protection cover 213 to the electric vehicle 200 in step S22.

Referring to FIG. 7, the battery charge station 100 first recognizes a location of the battery 10 using the image sensor (not shown) and then stores information on the location in step S23.

The determination for the location of the battery 10 can be implemented by various algorithms for determining a location of an object (battery) by analyzing a captured image using an imaging sensor.

If the location of the battery 10 is determined and stored, the battery charge station 100 controls a movement and location of the battery replacing robot 30 (battery transporting and mounting robot 31) in step S24. Thus, detaching and mounting of the battery 10 can be performed at the determined battery location.

On the other hand, in order to replace the battery, the ignition of the electric vehicle 200 is turned off in step S25 the battery fixing unit 212 is released to unlock the battery from the battery seating base 211 in step S26, and then this information is sent to the battery charge station 100 in step S27.

The battery charge station 100 may sense the location information of the battery replacing robot 30 (battery transporting and mounting robot 31) in step S28. In this case, when the sensed location corresponds to a location of a stored battery 10, the control moves to the next replacement step S29. In addition, when the sensed location does not correspond to the location of the stored battery 10, the battery charge station 100 may again sense the location information after controlling the movement and location of the battery replacing robot 30 (battery transporting and mounting robot 31) in steps S24 and S25.

The battery charge station 100 controls the battery replacing robot 30 (battery transporting and mounting robot 31) to eject the battery 10 from the battery seating base 211 in step S30 when it is determined that the battery 10 is unlocked in step S29, and sends this information to the electric vehicle 200 in step S31. Meanwhile, if it is confirmed that the battery 10 is not unlocked, the battery charge station 100 again requests the unlocking of the electric vehicle 200 to the electric vehicle 200 in step S32.

The battery 10 ejected from the electric vehicle 200 is transported to the battery ejecting and loading robot 32 and mounted on a charge and storage unit of the battery loading unit 70 in step S33 to perform the charge and management in step S34.

Figure 8:
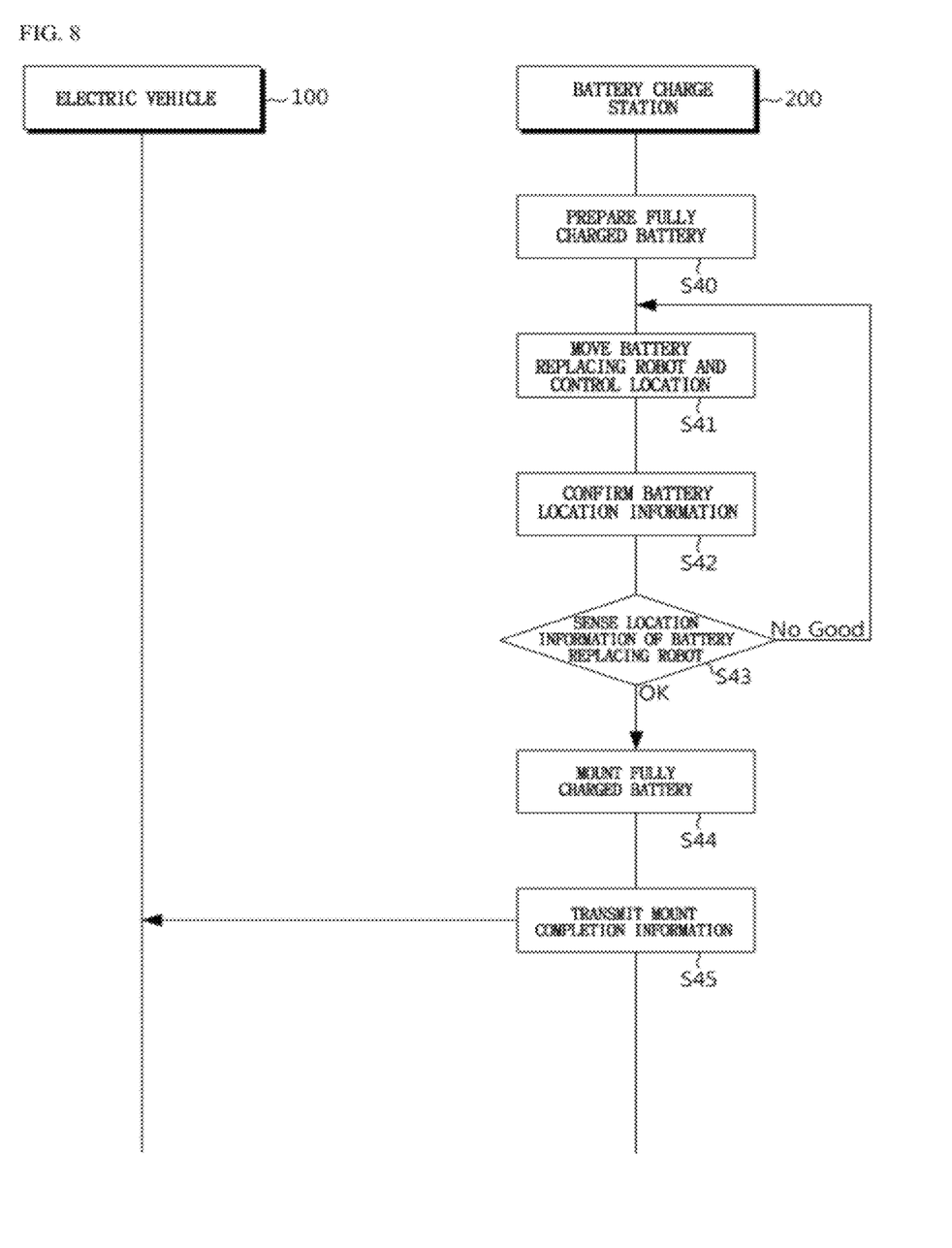

FIG. 8 is a flowchart illustrating a battery mounting method in a battery exchanging method of the electric vehicle 200 in accordance with an embodiment of the inventive concept.

Referring FIG. 8, in the battery charge station 100, based on information received from the electric vehicle 200 or pre-stored reservation information of the corresponding electric vehicle 200, a fully charged battery 10 to be mounted in the corresponding electric vehicle 200 is prepared in step S40.

The battery charge station 100 controls the movement and location of the battery replacing robot (battery transporting and mounting robot 31) in step S41 and confirms location information of the stored battery 10 in step S42. When the location of the battery replacing robot (battery transporting and mounting robot 31) is sensed in step S43 and the sensed location corresponds to that of the stored battery 10, this information is sent to the electric vehicle 200 after mounting the fully charged battery 10 in step S44. If the location of the battery replacing robot 30 does not correspond to that of the battery 10, the movement and location is again controlled and sensed in steps S41 and S43.

Here, since the detaching and mounting of the battery 10 may be performed concurrently, it should be noted that the process in FIG. 7 and the process in FIG. 8 need be not performed in consecutive order. In other words, when two battery transporting and mounting robots 31 are operated at the same time, one robot performs the detaching operation of the battery and the other robot performs the mounting operation of the battery, such that the preparation and the detaching processes of the fully charged battery can be accomplished at the same time.

Figure 9:
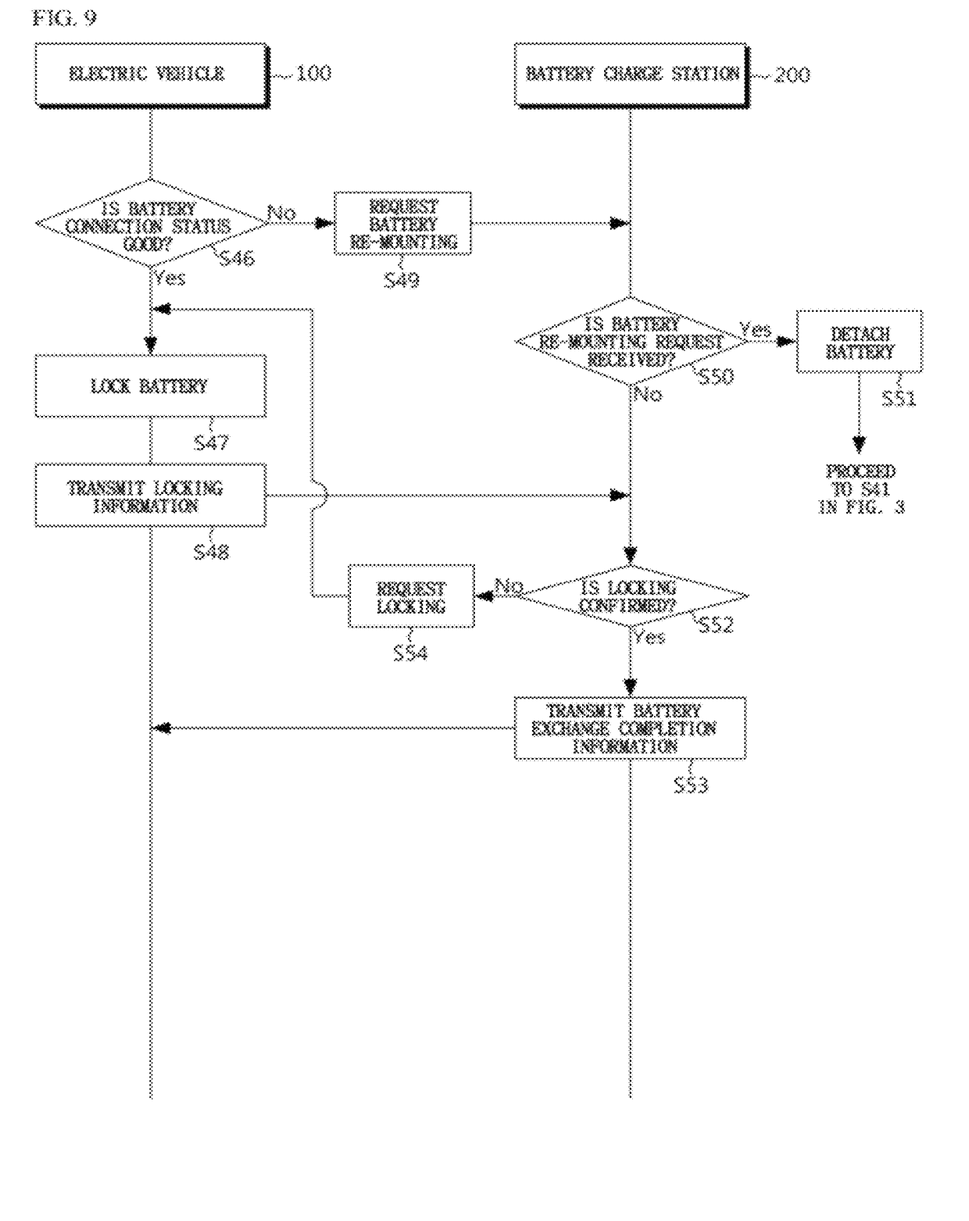

Referring to FIG. 9, the electric vehicle 200 may confirm whether a connection status of the battery is good when receiving battery mounting information in step S46.

If the connection status of the battery is good, the battery 10 is locked through the battery fixing unit 212 in step S47 and the locking information is sent to the battery charge station 100 in step S48.

On the other hand, if the connection status of the battery is bad, re-mounting of the battery is requested to the battery charge station 100 in step S49. In this case, when the battery re-mounting request is received in step S50, the battery charge station 100 performs detaching of the battery in step S51 and proceeds to step S41 in FIG. 8 to perform the re-mounting again in steps S41 to S45.

In the battery charge station 100, when the locking of the battery is confirmed in step S52, battery exchange completion information is sent to the electric vehicle 200 in step S53. If the locking is not confirmed, the battery locking is requested to the electric vehicle 200 in step S54.

Figure 10:
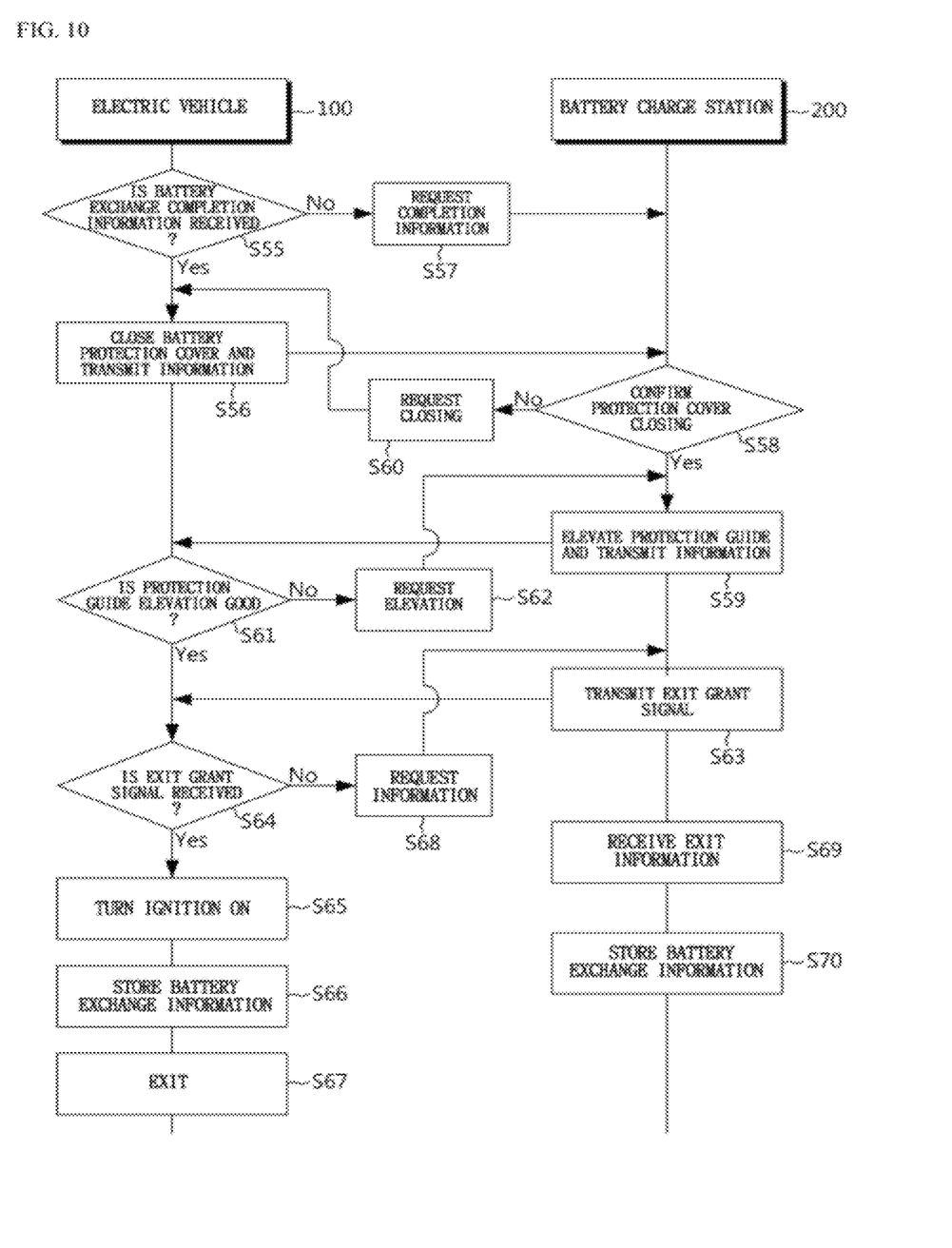

Referring to FIG. 10, when the battery exchange completion information is received in step S55, the electric vehicle 200 covers the battery protection cover 213, and this information is sent to the battery charge station 100 in step S56. If the battery exchange completion information is not received, the completion information is sent to the battery charge station 100 in step S57, and the battery charge station 100 confirms the locking of the battery to send the completion information in steps 52 and 53.

The battery charge station 100 confirms closing information of the protection cover 213 in step S58, elevates the protection guide 40 and sends this information to the electric vehicle 200 in step S59. If it is confirmed that the protection guide 40 is not closed, the battery charge station 100 requests the closing of the protection guide 40 again in step S60.

If it is not confirmed that the protection guide 40 is elevated in step S61, the electric vehicle 200 requests the elevation of the protection guide 40 to the battery charge station in step S62.

Meanwhile, after the protection guide 40 is elevated, the battery charge station 100 sends an exit grant signal to the electric vehicle 200 in step S63. When the exit grant signal is received in step S64, the ignition of the electric vehicle 200 is turned on in step S65, and the electric vehicle 200 stores the battery exchange information in step S66 and exits in step S67.

In the battery charge station 100, the exit information is received in step S69, the battery exchange information is stored, and the information on the battery 10 and the reservation information stored in the database 80 are updated in step S70.

According to the inventive concept, a battery exchange method by which a battery can be exchanged from an upper portion of an electric vehicle without inconvenience in the operation of the vehicle is provided. In addition, the battery exchange method by which the battery can be exchanged efficiently and conveniently is provided by automatically performing a battery replacing task through communication between an electric vehicle and a battery charge station.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. A method of exchanging a battery for an electric vehicle, comprising:
    (a) transmitting, to the electric vehicle, a confirmation signal that confirms an entry location of the electric vehicle when the electric vehicle enters a battery charge station;
    (b) lowering a protection guide installed in the battery charge station to seal a battery mounting module mounted on an upper portion of the electric vehicle, and transmitting a seal confirmation signal to the electric vehicle;
    (c) determining and storing a location of the battery mounted in the battery mounting module using an image sensor in the battery charge station;
    (d) ejecting a pre-mounted battery from a battery seating base of the battery mounting module by controlling movements and operations of a battery replacing robot in the battery charge station when unlocking information of the battery is transmitted from the electric vehicle;
    (e) controlling the battery replacing robot to move a prepared fully charged battery into a location of the battery mounting module and mounting the fully charged battery on the battery seating base in the battery charge station; and
    (f) transmitting mounting completion information from the battery charging station to the electric vehicle.

2. The method according to claim 1, further comprising, prior to step (a):
    (h) confirming whether the electric vehicle is a reserved vehicle when the electric vehicle enters a body of the battery charge station, and is in the battery charge station; and
    (i) transmitting an entry grant signal to the electric vehicle when the electric vehicle is reserved to confirm a type of the battery of the electric vehicle, and preparing the fully charged battery to be used in battery replacement and installed in the electric vehicle.

3. The method according to claim 1, wherein step (d) includes:
    (d-1) controlling the battery replacing robot to be moved to a location of the battery and to be located on the battery in the battery charge station; and
    (d-2) controlling the operation of the battery replacing robot when the unlocking information of the battery is confirmed, and ejecting the pre-mounted battery from the battery mounting module.

4. A battery exchange method for exchanging a battery of an electric vehicle, comprising:
    (a) opening a protection cover of a battery mounting module installed at an upper portion of the electric vehicle, and transmitting an open signal to a battery charge station from the electric vehicle;
    (b) releasing a locking unit of a pre-mounted battery, and transmitting an unlocking signal to the battery charge station from the electric vehicle;
    (c) determining and storing a mounting location of the battery using an image sensor in the battery charge station;
    (d) controlling movements and operations of a battery replacing robot when the unlocking signal is confirmed, and ejecting the pre-mounted battery from a battery seating base of the battery mounting module, in the battery charge station;
    (e) controlling movements and operations of the battery replacing robot to move a prepared fully charged battery into the battery mounting module, and mounting the fully charged battery on the battery seating base in the battery charge station;
    (f) transmitting a battery mounting completion signal from the battery charge station to the electric vehicle; and
    (g) locking the fully charged battery after confirming a connection of the battery in the electric vehicle.

5. The method according to claim 4, further comprising, prior to step (a):
(j) confirming an entry location when the electric vehicle enters the battery charge station; and
(k) lowering a protection guide installed in the battery charge station to seal the battery mounting module.

6. The method according to claim 4, further comprising, prior to step (a):
(h) confirming whether the electric vehicle is a reserved vehicle when the electric vehicle enters a body of the battery charge station; and
(i) transmitting an entry grant signal to the electric vehicle when the electric vehicle is reserved to confirm a type of the battery of the electric vehicle, and preparing the fully charged battery to be used in battery replacement and installed in the electric vehicle.

7. The method according to claim 4, wherein step (d) includes:
(d-1) controlling the battery replacing robot to be moved to a location of the battery and to be located on the battery in the battery charge station; and
(d-2) controlling the operations of the battery replacing robot when the unlocking signal of the battery is confirmed, and ejecting the pre-mounted battery from the battery mounting module.

8. A battery exchange method for exchanging a battery of an electric vehicle, comprising:
(a) opening a protection cover of a battery mounting module installed at an upper portion of the electric vehicle, and transmitting an open signal to a battery charge station from the electric vehicle;
(b) releasing a locking unit of a pre-mounted battery, and transmitting an unlocking signal to the battery charge station from the EV;
(c) removing the pre-mounted battery from the electric vehicle and mounting a fully charged battery on the battery mounting module;
(d) receiving, in the electric vehicle, mounting completion information from the battery charge station;
(e) locking the mounted fully charged battery in the electric vehicle and transmitting a locking signal to the battery charge station; and
(f) storing battery exchange information in the electric vehicle and the electric vehicle is exiting from the battery charge station when an elevating confirmation signal of a battery protection guide and an exit grant signal are received from the battery charge station.

9. The method according to claim 8, wherein step (e) includes:
(e-1) transmitting a re-mounting request signal to the battery charge station when a connection of the battery in the electric vehicle is bad;
(e-2) controlling movements and operations of a battery replacing robot to eject the battery having a bad connection from a battery seating base, in the battery charge station; and
(e-3) re-mounting the battery on the battery seating base by confirming information on a mounting location of the battery and controlling the movement and operation of the battery replacing robot.

10. A battery charge station system for an electric vehicle employing a battery exchange method, comprising:
a battery which is rechargeable and mounted on a battery mounting module of the electric vehicle;
a battery charge station body which is formed so as to allow the electric vehicle to freely access the battery charge station body and which has a battery loading unit for loading the battery;
a battery replacing robot provided in the battery charge station body to actually perform a replacement operation of the battery; and
a battery charge station control unit for allowing a battery replacing operation to be performed by controlling the battery replacing robot.

11. The battery charge station system according to claim 10, further comprising:
a communication module for receiving reservation information on battery replacement from the electric vehicle and providing confirmation information on whether it is possible to replace the battery.

12. The battery charge station system according to claim 10, wherein the battery charge station body comprises:
a protection guide for sealing the battery mounting module which mounts the battery when the electric vehicle enters the battery charge station, in order to avoid ill effects according to changes in an external environment when replacing the battery.

13. The battery charge station system according to claim 12, wherein the protection guide comprises:
a corrugate tube that is ejected by being folded toward the battery mounting module in a state in which the battery is mounted inside the battery charge station body when the battery is replaced and that is unfolded to an original position after completing replacement of the battery.

14. The battery charge station system according to claim 12, wherein the battery charge station body comprises:
a vertical body extending in a vertical direction and coming in contact with a road, and a horizontal body extending in a horizontal direction from a top portion of the vertical body toward the road wherein
a bottom of the horizontal body is provided with at least one outlet for taking the battery out and said at least one outlet includes the protection guide.

15. The battery charge station system according to claim 10, wherein the battery replacing robot comprises:
a battery transporting and mounting robot for removing a discharged battery previously mounted in the battery mounting module, and transporting and mounting a charged battery, which is ejected from the battery loading unit, to the battery mounting module; and
a battery ejecting and loading robot for ejecting a charged battery stored in the battery loading unit and providing the charged battery to the battery transporting and mounting robot, or receiving a discharged battery from the battery transporting and mounting robot, and loading into the battery loading unit.

16. The battery charge station system according to claim 15, wherein the battery transporting and mounting robot comprises:
a fixed rail installed at an upper portion of the battery charge station body;
a transporting rail installed to be moved in a direction orthogonal to the fixed rail;
an elevating rail installed to be moved along a longitudinal direction of the transporting rail, or in an orthogonal direction to the transporting rail; and
a clamping unit installed at a bottom of the elevating rail to perform locking and unlocking operations in a process of replacing the battery.

* * * * *